April 21, 1964  J. W. DAVIS  3,129,790
CALIPER-TYPE DISC BRAKES
Filed Aug. 28, 1962  3 Sheets-Sheet 1

Inventor:
John Walter Davis
by Benj. T. Rauber
attorney

United States Patent Office 3,129,790
Patented Apr. 21, 1964

3,129,790
CALIPER-TYPE DISC BRAKES
John Walter Davis, Kings Norton, Birmingham, England, assignor to Dunlop Rubber Company Limited, County of London, England, a British company
Filed Aug. 28, 1962, Ser. No. 219,885
Claims priority, application Great Britain Sept. 6, 1961
12 Claims. (Cl. 188—73)

This invention relates to disc brakes and particularly to disc brakes operable by mechanical means.

Brakes are known in which a disc secured to a wheel, shaft or the like and rotatable therewith is frictionally engaged by a pair of opposed non-rotatable friction elements which are pressed onto the radial braking surfaces of the disc each by a pressure member pivoted to a non-rotatable part of the structure. The pressure members are pivoted at one end and a tie-rod extending across the plane of the disc adjacent the periphery thereof engages one pressure member, the other end of the tie-rod being so connected to a lever pivoted on the other pressure member that angular movement of the lever causes its associated pressure member to move towards the disc while the tie-rod draws the opposing pressure member towards the disc. The tie-rod is usually provided with a head having a domed underside which engages a complementary recess in one pressure member, and a threaded end which passes freely through a trunnion block trunnioned on a bifurcated operating lever inwardly of the pivot of the latter. A nut is provided on the threaded end and this abuts the trunnion block when the lever is moved to actuate the brake. As wear of the pads takes place the lever has a constantly increasing brake application stroke unless the nut is rotated to shorten the effective length of the tie-rod, i.e. the distance between the head of the rod and the trunnion block.

A drawback of this kind of brake from the point of view of compactness is that if adequate leverage is to be obtained the lever must be proportionately long and space must be provided to allow adequate travel for the lever.

The object of the present invention is to provide a disc brake comprising an improved operating mechanism.

According to the present invention a disc brake of the kind comprising a rotatable disc, non-rotatable friction elements associated with angularly-movable pressure members to engage opposite braking surfaces of the disc and a lever member situated adjacent one of said pressure members and operable to effect said engagement, said lever member being angularly positioned relative to said adjacent pressure member, in a plane parallel or substantially parallel to that of the disc, in such a manner that a piston and cylinder or like mechanism to operate said lever member may be positioned alongside said adjacent pressure member.

Also according to the present invention a disc brake comprising a first pressure member pivotable on a non-rotatable part of the brake on one side of a rotatable disc, a tie-rod engaging the free end of the first pressure member and extending across the plane of the disc adjacent to the periphery thereof, a second pressure member pivotable at one end to a non-rotatable part of the brake on the opposite side of the disc, an operating lever pivotable at one end to the free end of said second pressure member and engaging the tie-rod intermediate its ends, actuating means operable on the other end of said operating lever, friction elements carried by said pressure members intermediate their ends, wherein the longitudinal axis of the pressure members are angularly off-set in respect to each other in such a way that the reaction points between the friction elements and the pressure plates are axially aligned on opposite sides of the disc.

Preferably the longitudinal axis of the operating lever is angularly off-set in respect to the second pressure member in such a manner that the actuating means operable on said operating lever may be positioned alongside said second pressure member.

A disc brake incorporating the present invention will now be described with reference to the accompanying drawings of which:

Figure 1:
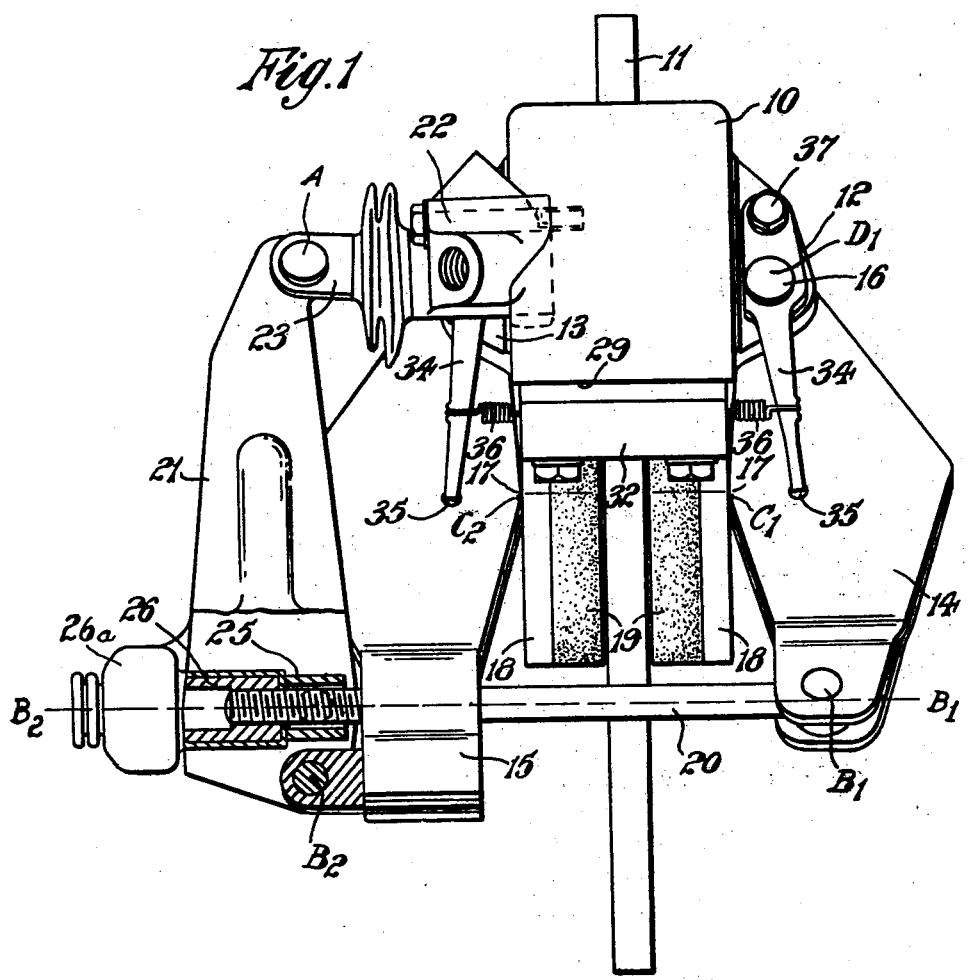
FIGURE 1 is a plan view of a disc brake incorporating the present invention with a portion of the operating lever broken away in section.
Figure 2:
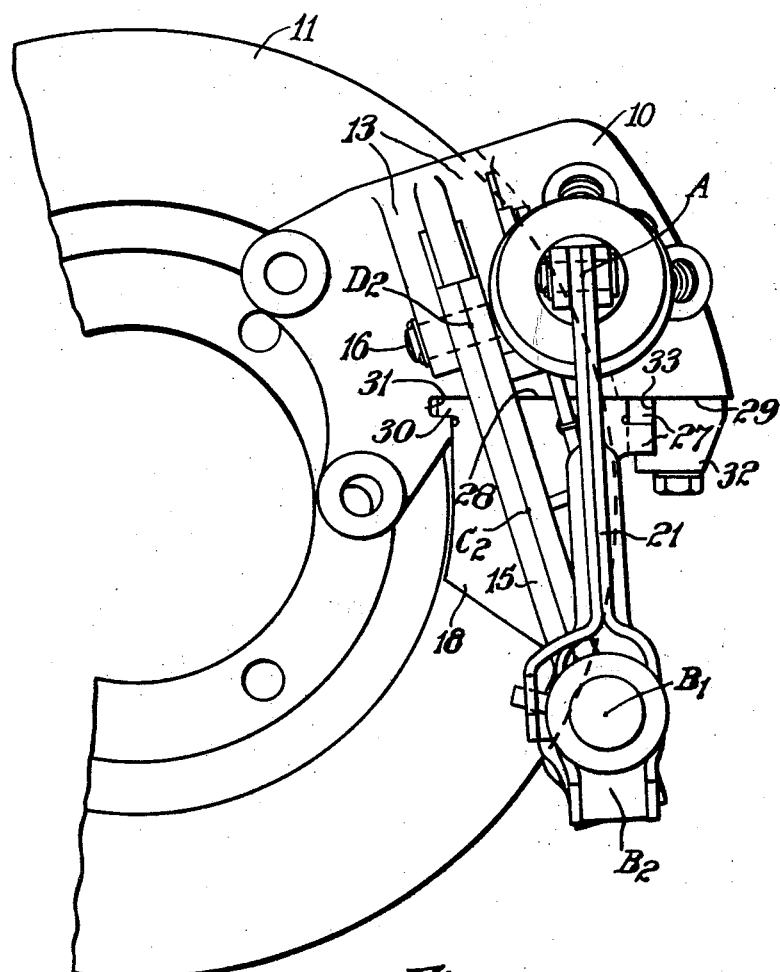
FIGURE 2 is a side view of the disc brake illustrated in FIGURE 1 showing the angled relationship of the operating lever and the adjacent pressure member.
Figure 3:
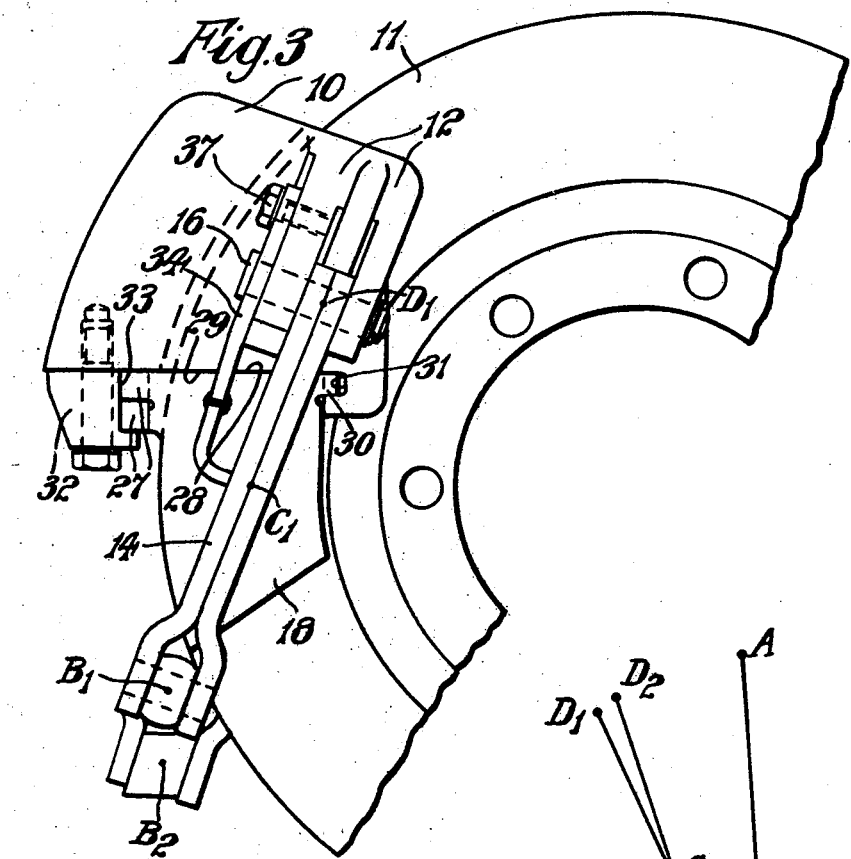
FIGURE 3 is a view from the opposite side of the disc brake from that shown in FIGURE 2.

A disc brake has a non-rotatable caliper 10 straddling the outer periphery of an annular disc 11 secured to and rotatable with a wheel (not shown) of a vehicle to be braked. Two pairs of lugs 12 and 13 formed integral with the caliper and extending axially outwardly away from the opposite sides of the disc 11 are adapted to have pressure members 14 and 15 respectively pivotably secured therebetween by means of pivot pins 16. The lugs 12 and 13 are not positioned axially opposite each other i.e. D1 and D2 on the centre lines of the pressure members 14 and 15 but are displaced substantially radially of the disc 11 with respect to each other. The pressure members 14, 15 are arranged to extend adjacent the braking surfaces of the disc 11 away from the lugs 12, 13 in directions slightly angled to each other in such a manner that small convex protrusions 17 disposed intermediate the ends of the pressure members 14, 15 are in axial alignment. The protrusions 17 are adapted to bear on the backing plates 18 of friction pads 19 which are guided by the caliper 10 towards and away from the adjacent braking surfaces of the disc 11.

A tie-rod 20 disposed across the plane of the disc 11 adjacent the outer periphery thereof is pivotably secured to the free end of the pressure member 14. An operating lever 21 is pivoted at the free end of the pressure member 15 so that the planes in which the operating lever 21 and the pressure member 15 are permitted to move are angled slightly with respect to each other. The operating lever 21 extends from its pivot in the general direction of the caliper 10 where a fluid pressure operated piston and cylinder mechanism 22 formed integral with the caliper 10 is adapted by means of a push rod 23 to rotate the operating lever 21 about its pivot.

The tie-rod 20 passes through a bifurcated portion of the pressure member 15 adjacent the pivot point of the operating lever 21 and through a trunnion block 25 mounted between the bifurcated arms of the operating lever 21. The free end of the tie-rod 20 is threaded and a nut 26 is screwed thereon so that the nut 26 and the trunnion block 25 are in abutment. An automatic adjuster 26ª of the type described in Patent 3,111,196, Nov. 19, 1963, but preferably of the type described in co-pending British patent application No. 27,789/61 is mounted on the lever adjacent the nut 26 so that the effective length of the tie-rod 20 i.e. the distance between the pivot point of the tie-rod and the trunnion block, can be shortened by rotating the nut.

The friction pads 19, which are of circumferentially displaced segmental shape are provided with backing plates 18 of the same shape. The backing plates 18 each have a tongue 27 which is bent over at right angles to the backing plate 18 and extends across the periphery of the disc 11. The edges 28 of the friction pads 19 abut a machined face 29 on the caliper 10 and are retained in this position by a projection 30 on the radial inner edge of the backing plate 18 which engages a recess 31 at the inner end of the machined face 29. The tongues 27 projecting from the backing plates 18 are spaced circumferentially of each other so that a keep member 32 bolted to the caliper 10 at the outer end of the machined face 29 forms a slot 33 in which both tongues 27 slidably fit to permit movement of both backing plates 18 and their friction pads 19 in an axial direction.

A pair of springy but deformable retractor fingers 34 extending from the lugs 12, 13 alongside of each pressure member 14, 15 are turned over at their ends to engage in holes 35 in the pressure members 14, 15. A return spring 36 is positioned in tension between each of the retractor fingers 34 and the backing plates 18 so that the latter moves back from the disc 11 with the pressure members 14, 15 the force of the springs 36 being less than that of the retractor fingers. The retractor fingers 34 are rigidly secured to the lugs 12, 13 by the pins 16 and bolts 37 and have sufficient resilience to retract the pressure members 14, 15 after each brake application but are capable of being progressively deformed as wear of the friction pads 19 takes place.

The operating lever 21 may be actuated by mechanical means as well as by the fluid pressure operated piston and cylinder mechanism 22. Movement of the operating lever 21 in a brake applying direction causes the pressure member 15 to press its associated friction pad 19 against the braking surface of the disc 11 and the tie-rod 20 draws the pressure member 14 and its associated friction pad 19 towards the opposite braking surface of the disc. As wear of the friction pads 19 occurs the automatic adjuster shortens the effective length of the tie-rod to maintain the friction pads 19 at the desired clearance from the braking surface of the disc 11 when the pressure members 14, 15 are in the "brakes off" position.

The wear of the friction pads 19 is kept uniform over the whole surface of their braking face by the interengaging of the two tongues 27 in the slot 33. This prevents twisting of the friction pads which would cause accelerated wear on the leading edge thereof.

Figure 4:
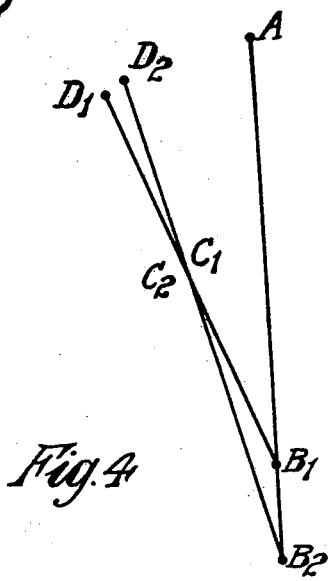
FIGURE 4 illustrates a diagrammatic projection of the arrangement of the pressure members and the operating lever.

FIGURE 4 illustrates diagrammatically the projection of the arrangement of the pressure members and the operating lever. The point A represents the centre line of the piston and cylinder mechanism 22, the point B1 represents the centre line of the tie-rod 20 and the point B2 represents the effective pivot point of the operating lever to the pressure member 15. All these three points A, B1 and B2 are arranged on the longitudinal centre line of the operating lever 21. The points C1 and C2 correspond to the convex protrusions 17 on the pressure members 14 and 15. The line drawn from D1, positioned intermediate the lugs 12, through C1 to B1 represents the pressure member 14, whilst the line drawn from D2, positioned intermediate the lugs 13, through C2 to B2 represents the pressure member 15.

The advantage of the present invention is that the disposition of the pressure members and the operating lever allows the lever and the fluid pressure piston and cylinder mechanism to be moved out of the plane of the adjacent pressure member and at the same time permit only simple bending forces to be applied to the pressure members and operating lever.

Having now described my invention, what I claim is:

1. A disc brake comprising a rotatable disc, a pair of friction elements, one adjacent each radial face of the disc, a non-rotatable caliper straddling a periphery of the disc, a pair of pressure members attached to the caliper one on each side of the disc and tiltable in planes intersecting in a line normal to the plane of said disc, each pressure member bearing against the friction element on the same side of the disc and in the line of intersection of said planes to urge said friction element into frictional engagement with the adjacent face of the disc, and brake actuating means tiltable in a plane intersecting the planes of tilting of said pressure members, said brake actuating means being connected to said pressure members on the lines of intersection of the planes of tilting of said pressure members with the plane of tilting of said brake-actuating means.

2. The disc brake of claim 1 in which said pressure members extend from said caliper beyond the periphery of said disc and said brake actuating means comprises an actuating lever connected to one of said pressure members and a tie rod beyond the periphery of said disc connecting said actuating lever to the other pressure member.

3. The disc brake of claim 2 in which said tie rod is connected to said actuating lever between its connection to said pressure member and the opposite end of said actuating lever.

4. The disc brake of claim 1 in which said pressure members have convex protuberances bearing against said friction elements.

5. The disc brake of claim 1 comprising a piston and cylinder assembly mounted on said caliper and connected to said brake actuating member.

6. The disc brake of claim 1 comprising lugs on opposite sides of said caliper in which said pressure members are respectively pivoted, the lug on one side of said caliper being spaced in a radial direction relative to said disc from the lug on the opposite side of said caliper.

7. The disc brake of claim 1 in which each friction element comprises a backing plate against which one of said pressure members abuts, each backing plate having a tongue extending across the periphery of the disc and slidably contacting the tongue of the backing plate on the opposite side of the disc on a surface normal to the surface of said disc.

8. The disc brake of claim 1 in which said caliper has a machined surface against which said friction elements abut.

9. The disc brake of claim 1 in which said friction element comprises a backing plate and each backing plate has a tongue extending transversely of and beyond the periphery of said disc and in sliding engagement with the tongue of the opposite backing plate on a surface normal to the surface of said disc and has a projection extending from the opposite edge of said backing plate radially inwardly relative to said disc, and said caliper has a machined surface normal to the plane of said disc against which said backing plates abut, and has a keep-piece holding said tongues in alignment with said surface of said caliper, and a recess to receive the projections from the radially inward side of said backing plates.

10. The disc brake of claim 1 in which said pressure plates extend beyond the periphery of said disc and said actuating means comprises a tie rod connected to the projecting end of one of said pressure members and extending through the projecting end of the opposite pressure member, the end of projecting through said pressure member being screw-threaded, and a nut threaded onto the thread end of said tie rod, an actuating lever pivotally mounted on the end of said lever through which said tie rod extends, and having a trunnion box engaging said nut, said nut being rotatable on said threaded portion of said tie rod to adjust the distance between said trunnion box and the connection of said tie rod to the pressure member on the opposite side of said disc.

11. The disc brake of claim 10 having means to adjust said nut automatically as said brake elements wear.

12. The disc brake of claim 10 comprising a piston and cylinder assembly mounted on said caliper and engaging the end of said lever opposite its pivotal connection to said pressure member.

References Cited in the file of this patent

UNITED STATES PATENTS

| | | |
|---|---|---|
| 1,978,974 | Williams | Oct. 30, 1934 |
| 2,781,106 | Lucien | Feb. 12, 1957 |
| 2,867,295 | Butler | Jan. 2, 1959 |
| 3,042,152 | Butler | July 3, 1962 |